(12) United States Patent
Fejerdy

(10) Patent No.: US 6,422,543 B1
(45) Date of Patent: Jul. 23, 2002

(54) SELF-CLOSING PNEUMATIC SPRING SYSTEM

(75) Inventor: Stefan Fejerdy, Budapest (HU)

(73) Assignee: Phoenix AG, Hamburg (DE)

( * ) Notice: Subject to any disclaimer, the term of this patent is extended or adjusted under 35 U.S.C. 154(b) by 0 days.

(21) Appl. No.: 09/763,801

(22) PCT Filed: Apr. 27, 2000

(86) PCT No.: PCT/DE00/01324

§ 371 (c)(1),
(2), (4) Date: Feb. 27, 2001

(87) PCT Pub. No.: WO01/03957

PCT Pub. Date: Jan. 18, 2001

(30) Foreign Application Priority Data

Jul. 7, 1999 (DE) .......................................... 199 31 195

(51) Int. Cl.[7] .................................................. F16F 5/00
(52) U.S. Cl. ................... 267/122; 267/64.23; 267/64.28
(58) Field of Search ................................ 267/122, 123, 267/64.23, 64.27, 64.28, 64.22, 64.18; 280/124.157, 124.158

(56) References Cited

U.S. PATENT DOCUMENTS

| 3,633,899 A | * | 1/1972 | Blout | .......................... 267/122 |
| 4,786,035 A | | 11/1988 | Elliott | |
| 5,388,849 A | * | 2/1995 | Arsenault et al. | .... 267/64.27 X |
| 5,749,566 A | | 5/1998 | Vitale et al. | ............. 267/64.23 |

FOREIGN PATENT DOCUMENTS

| DE | 42 28 513 | 3/1994 |
| DE | 195 39 151 | 4/1997 |
| SU | 1 693 299 | 11/1991 |
| WO | WO98/54016 | 12/1998 |

* cited by examiner

*Primary Examiner*—Pam Rodriguez
(74) *Attorney, Agent, or Firm*—Collard & Roe, P.C.

(57) ABSTRACT

The invention relates to a pneumatic spring system (1) comprising at least the following components, specifically: a pneumatic spring cover (2) and a pneumatic spring piston (4), which are arranged opposing each other; a pneumatic spring bellows (3) made of elastomer material, which connects the pneumatic spring cover (2) and the pneumatic spring piston (4) with each other with the use of fasteners (8), whereby the bellows is capable of rolling off on the outer wall of the piston (5) with formation of an internal chamber (6) of the pneumatic spring having an elastic volume; as well as a connection (7) for ventilating and evacuating the internal chamber (6) of the pneumatic spring. The pneumatic spring system is equipped with a pressure-sensitive connection system which reacts to pressure in a way such that in the evacuated condition, the pneumatic spring cover (2) and the pneumatic spring piston (4) are connected with each other, whereby the connection is released again in the operating conditions, i.e. when the internal chamber (6) of the pneumatic spring is filled with air.

15 Claims, 4 Drawing Sheets

SELF-CLOSING PNEUMATIC SPRING SYSTEM

CROSS REFERENCE TO RELATED APPLICATIONS

Applicant claims priority under 35 U.S.C. §119 of German Application No. 199 31 195.1, filed Jul. 7, 1999. Applicant also claims priority under 35 U.S.C. §120 of PCT/DE00/01324, filed Apr. 27, 2000. The international application under PCT article 21(2) was not published in English.

BACKGROUND OF THE INVENTION

1. Field of the Invention

The invention relates to a pneumatic spring system comprising at least the following components, specifically

- a pneumatic spring cover and a pneumatic spring piston, which are arranged opposing each other;
- a pneumatic spring bellows made of elastomer material, which connects the pneumatic spring cover and the pneumatic spring piston with each other with the use of fastening means, said pneumatic spring bellows being provided with an embedded reinforcement in most cases, whereby the bellows is capable of rolling off on the outer wall of the piston with formation of an interior chamber of the pneumatic spring having an elastic volume; as well as
- a connection for ventilating and evacuating the interior chamber of the pneumatic spring.

2. The Prior Art

A pneumatic spring system of said type is described, for example in the published patent documents DE 42 28 513 A1 and WO 98/54016 A1.

Pneumatic spring systems may be in the following two conditions:

(a) Filled with air (operating condition), or
(b) evacuated.

Now, the following problem is posed in conjunction with pneumatic spring systems of vehicles, in particular with vehicles that are lifted by a crane. When the vehicle is set down again, the bellows of the pneumatic spring system often no longer rolls off correctly on the outer wall of the roll-off piston. The consequence thereof are damage caused to the bellows of the pneumatic spring system and also to other components, which may then lead to total failure of a pneumatic spring system. Particularly critical is in this conjunction the condition (b) in which the vehicle is lifted by the crane.

Now, the problem of the invention against the background of said problems consists in providing a pneumatic spring system of the type specified above that is self-closing, so that the vehicle can be lifted by the crane when the pneumatic spring system is in the condition (b) without causing damage to the pneumatic spring system, but the latter will be fully operational again when it is in the condition (a).

SUMMARY OF THE INVENTION

Said problem is solved in that the pneumatic spring system is equipped with a pressure-sensitive connection system that is located within the internal chamber of the pneumatic spring and reacts to pressure in a way such that the pneumatic spring cover and the pneumatic spring piston are connected with each other when the system is in the evacuated condition, and that said connection is released again by the internal pressure when the system is in the operating condition, i.e. when the internal chamber of the pneumatic spring is filled with air.

BRIEF DESCRIPTION OF THE DRAWINGS

Now, the invention is explained in the following with the help of exemplified embodiments and by reference to three drawings, in which.

Figure 1:
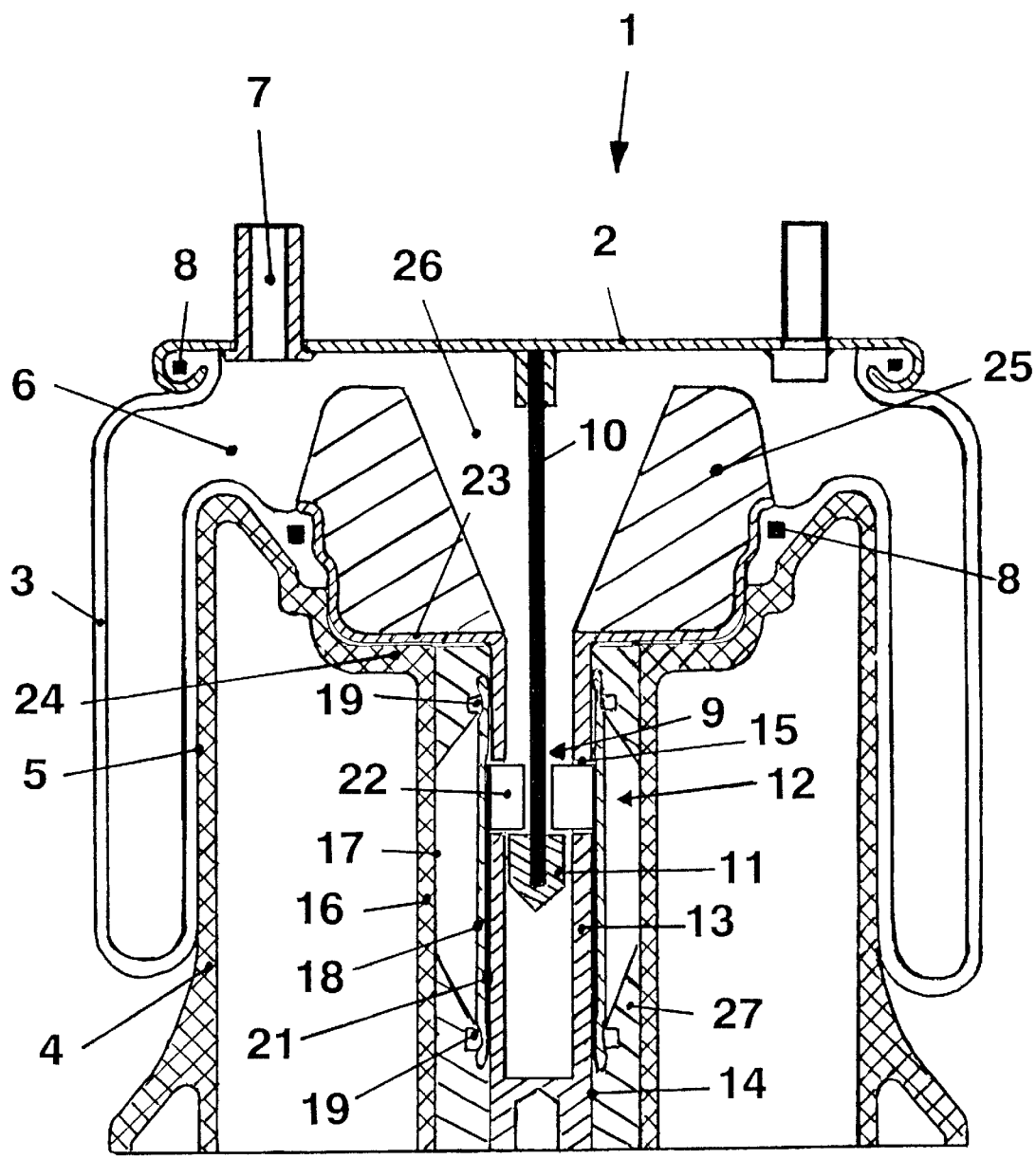
FIG. 1 shows an axial section through an evacuated pneumatic spring system with the connection system closed.

The following list of reference numerals applies in conjunction with the above figures:
1 Pneumatic spring system
2 Pneumatic spring cover
3 Pneumatic spring bellows made of elastomer material
4 Pneumatic spring piston (roll-off or immersion piston
5 Outer wall of pneumatic spring piston (roll-off zone)
6 Internal chamber of pneumatic spring
7 Connection for ventilating and evacuating the internal chamber of the pneumatic spring
8 Fastening means for fastening the pneumatic spring bellows
9 Pressure-sensitive connection system
10 Connection rod
11 Barb
12 Pressure-sensitive closing element
13 Internal cylinder
14 Outer side of internal cylinder
15 Lateral breakthrough
16 External cylinder (inner housing of roll-off cylinder)
17 Interior side of external cylinder
18 Cylindrical diaphragm made of elastomer material
19 Fastening means for diaphragm
20 Spring element
21 Spring arm
22 Stop
23 Flange-shaped widening of internal cylinder
24 Flange-shaped widening of external cylinder
25 Stop buffer
26 Funnel-shaped breakthrough
27 Support
28

DETAILED DESCRIPTION THE PREFERRED EMBODIMENT

FIG. 1 shows a pneumatic spring system 1, whereby a pressure-sensitive connection system 9 is located within the internal chamber 6 of the pneumatic spring. Said system consists in this conjunction of a connection rod 10, which is secured on the inner side and centered on the pneumatic spring cover 2, and which is provided with a barb 11 located within the connection zone. Said system, furthermore, comprises a pressure-sensitive connection element 12, which is integrated within the pneumatic spring piston 4 and in turn comprises the following components, specifically an internal cylinder 13 for receiving the connection rod 10, whereby the internal cylinder is at least provided with the two lateral breakthroughs 15;

an external cylinder 16, which, in the present case, at the same time forms the inner housing of the pneumatic spring piston;

a cylindrically shaped diaphragm 18 made of elastomer material, which is arranged between the internal cylinder 13 and the external cylinder 16, and which is secured with each of its ends on the outer side 14 of the internal cylinder 13 with the use of the fastening means 19; and at least two spring elements each consisting of a spring arm 21 and a stop 22, the latter projecting into the corresponding breakthrough 15 of the internal cylinder 13, whereby in the evacuated condition according to FIG. 1, the spring element is completely pressed against the outer side 14 of the internal cylinder 13 by means of the diaphragm 18, so that the stop 22 projecting into the breakthrough 15 comes to rest behind the barb 11 of the connection rod 10 and thus effects the closure.

The diaphragm 13 is equipped particularly within its fastening area (fastening means 19) with an embedded reinforcement that consists of a substantially non-expandable material. The pressure-sensitive part of the diaphragm 18, thus the zone located between the fastening means 19, however, is free of any reinforcement in order to prevent the flexibility of the diaphragm from being impaired.

Furthermore, the internal cylinder 13 is provided at its top end with a flange-shaped widening 23 that rests on a flange-shaped widening 24 of the external cylinder 16. In turn, a stop buffer 25 made of elastomer material rests on the widening 23. Said stop buffer is provided with a center, funnel-shaped breakthrough 26 for the connection rod 10. A limitation of the path is achieved in this way in the event the barb 11, during the closing process, immerses into the internal cylinder 13 too deeply and thus too far beyond the stop 22 of the spring element. A buffer action is effected at the same time versus the pneumatic spring cover 2.

The sensitivity of the connection system 9 to pressure is adjusted in a way such that said connection will close also in the event a minimal excess pressure has remained in the internal chamber 6 of the pneumatic spring, so that the pneumatic spring cover 2 is connected with the pneumatic spring piston 4 even if no complete evacuation has occurred.

The pneumatic spring cover 2 is provided with a connection 7 for ventilating and evacuating the internal chamber 6 of the pneumatic spring. Although this is the most frequently employed system principle, the connection may be located also on another component of the pneumatic spring, for example on the pneumatic spring bellows 3 (DE 42 26 513 A1). The connection is usually valve-controlled.

Figure 2:
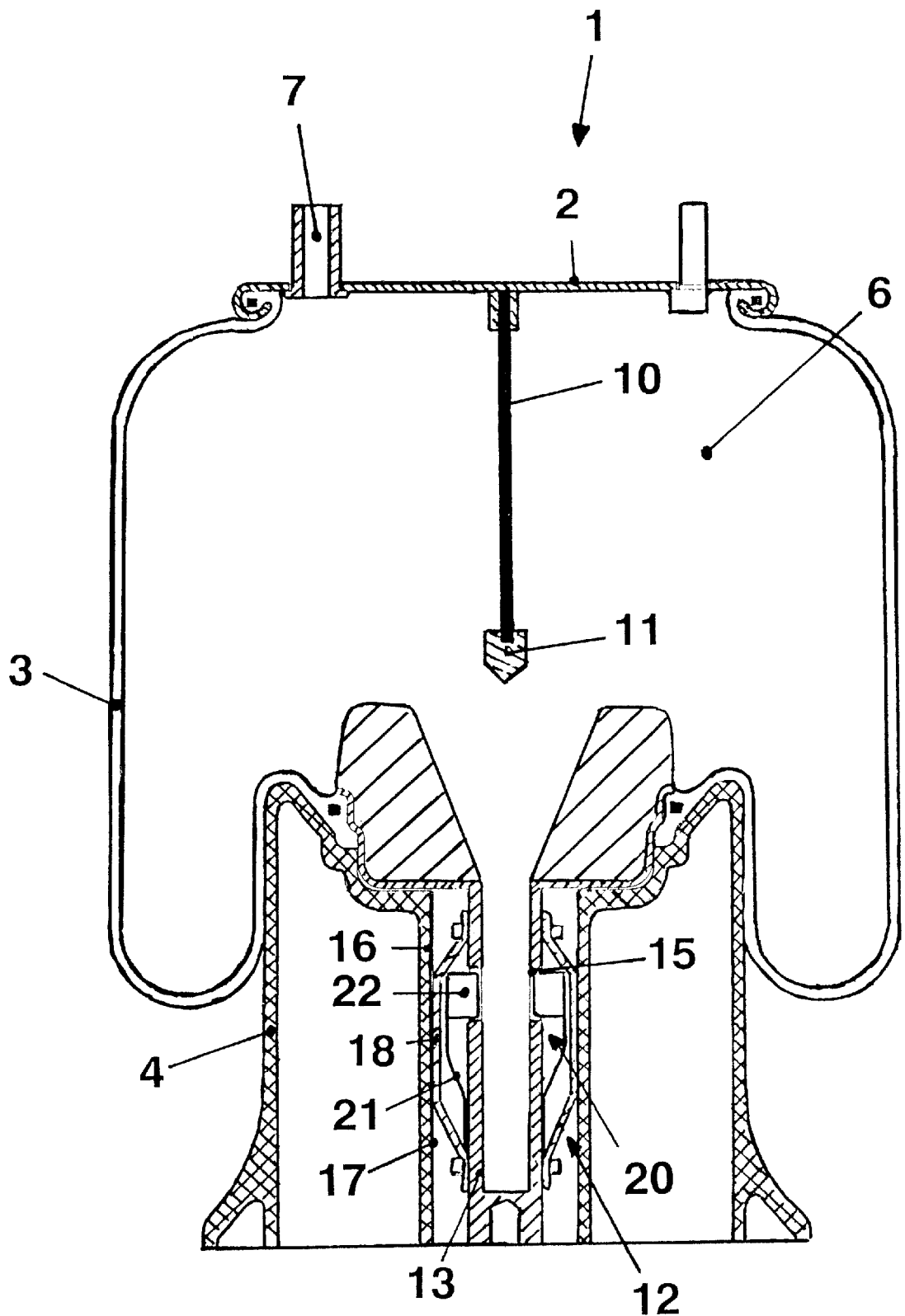
FIG. 2 shows an axial section through a pneumatic spring system with the connection shystem open (operating condition)

Now, FIG. 2 shows a pneumatic spring system in the operating condition, in which the connection rod 10 with the barb 11 is extended. The diaphragm 18 now rests against the inner side 17 of the external cylinder 16. This causes the spring element 20, which comprises the spring arm 21 and the stop 22, to release the internal cylinder 13 in that the stop 22 now still projects in the breakthrough 15 only partly (i.e. not in a closing manner).

An additional support 27 (FIG. 1) for supporting the diaphragm in the operating condition may be provided between the internal cylinder 13 and the external cylinder 16, specifically within the zone where the diaphragm 18 is secured.

Figure 3:
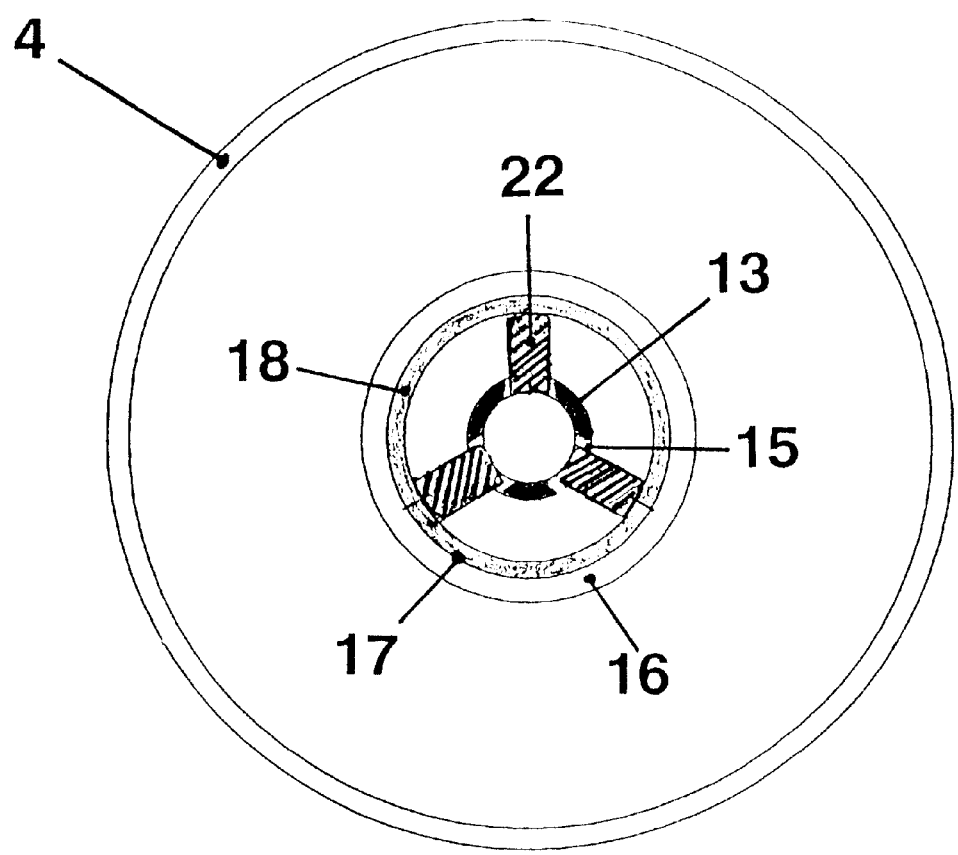
FIG. 3 shows a radial section through a pneumatic spring system within the zone of the diaphragm and thr gpring element (operating condition).

Now, FIG. 3 shows the pneumatic spring piston 4 with the external cylinder 16, with the cylindrically shaped diaphragm 18 resting against the inner side 17 of said external cylinder in the operating condition.

Figure 4:
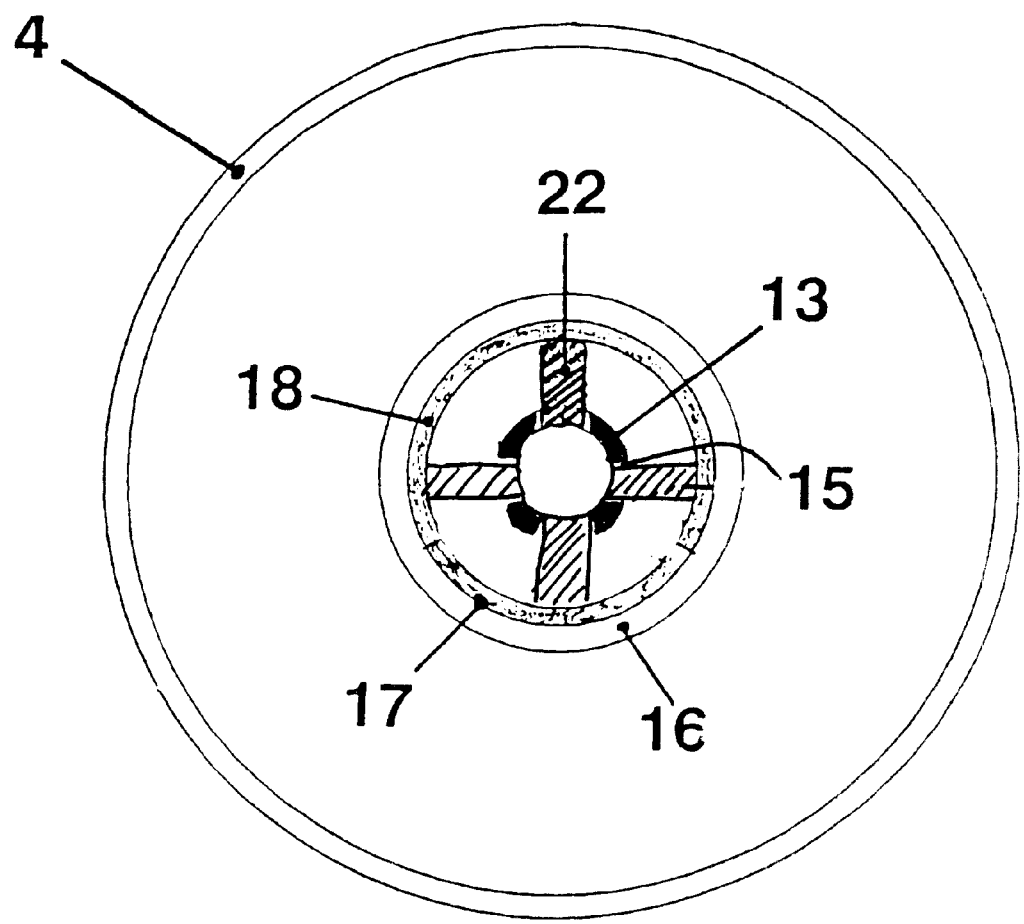
FIG. 4 shows a radial section as in FIG. 3 of another embodiment of the invention.

Within the framework of a particularly useful embodiment, three spring elements are provided, which are arranged with the spacing of one third of a circle between each other, whereby the three corresponding breakthroughs 15 are associated with the total of three stops 22. The internal cylinder 13 is released in said condition. FIG. 4 shows another embodiment wherein there are four spring elements 20 arranged spaced by a fourth part of a circle from one another, and four corresponding breakthroughs 15 are associated with a total of four stops 22.

What is claimed is:

1. A pneumatic spring system (1) comprising:

a pneumatic spring cover (2) and a pneumatic spring piston (4), which are arranged opposing each other;

a pneumatic spring bellows (3) made of elastomer material, which connects the pneumatic spring cover (2) and the pneumatic spring piston (4) with each other with the use of fastening means (8), and which is provided with an embedded reinforcement, wherein the bellows rolls off on the outer wall (5) of the piston with formation of an internal chamber (6) of the pneumatic spring having an elastic volume;

a connection (7) for ventilating and evacuating the internal chamber (6) of the pneumatic spring;

a pressure-sensitive connection system, disposed within the internal chamber (6) of the pneumatic spring and reacting to pressure so that in the evacuated condition, the pneumatic spring cover (2) and the pneumatic spring piston (6) are connected with each other, wherein the connection is released again by the internal pressure in the operating condition when the internal chamber (6) of the pneumatic spring is filled with air, said pressure-sensitive connection system comprising:

a connection rod (10), which is provided within a zone of connection with a barb (11)), and a pressure-sensitive closing element (12), which is engaged in a locking manner by the barb (11) of the connection rod (10) in the evacuated condition.

2. The pneumatic spring system according to claim 1, characterized in that the pressure-sensitive closing element (12) comprises at least the following components:

an internal cylinder (13) for receiving the connection rod (10), whereby the internal cylinder is provided with at least one lateral breakthrough (15);

an external cylinder (16);

a cylindrically shaped diaphragm (18) made of elastomer material, which is connected with each end with the outer side (14) of the internal cylinder (13) via fastening means (19), and which, in the operating condition, rests against the inner side (17) of the external cylinder (16) with simultaneous release of the internal cylinder (13); and at least one spring element (20), wherein each spring element consists of a spring arm (21) and a stop (22), said stop projecting into the corresponding breakthrough (15) of the internal cylinder (13), wherein in the evacuated condition, the spring element is completely pressed against the outer side (14) of the internal cylinder (13) by the diaphragm (18), so that the stop (22) projecting into the breakthrough (15) comes to rest behind the connection rod (10) and thus effects closure.

3. The pneumatic spring system according to claim 2, wherein two spring elements (20) are provided, said spring elements being arranged opposing each other, wherein two corresponding breakthroughs (15) are associated with a total of two stops (22).

4. The pneumatic spring system according to claim 2, wherein three spring elements (20) are provided, said spring elements being arranged spaced by a third part of a circle from each other, wherein three corresponding breakthroughs (15) are associated with a total of three stops (22).

5. The pneumatic spring system according to claim 2, wherein four spring elements (20) are provided, said spring elements being arranged spaced by a fourth part of a circle from each other, whereby four corresponding breakthroughs (15) are associated with a total of four stops (22).

6. The pneumatic spring system according to claim 2, wherein the pressure-sensitive closing element (12) is integrated within the pneumatic spring piston (4), whereas the connection rod (10) is secured on the inner side and centered on the pneumatic spring cover (2).

7. The pneumatic spring system according to claim 6, wherein the external cylinder (16) of the pressure-sensitive closing element (12) forms the inner housing of the pneumatic spring piston (4).

8. The pneumatic spring system according to claim 2, wherein the internal cylinder (13) is provided at a top end with a flange-shaped widening (23), said widening resting on a flange-shaped widening (24) of the external cylinder (16).

9. The pneumatic spring system according to claim 8, wherein the pressure-sensitive connection system (9) is provided with a stop buffer (25) made of elastomer material.

10. The pneumatic spring system according to claim 9, wherein the stop buffer (25) rests on the flange-shaped widening (23) of the internal cylinder (13) and is provided with a center breakthrough (26) for the connection rod (10).

11. The pneumatic spring system according to claim 10, wherein the center breakthrough (26) has the shape of a funnel.

12. The pneumatic spring system according to claim 2, wherein the diaphragm (18) is equipped within a fastening zone with an embedded reinforcement, whereas a pressure-sensitive part of the diaphragm is free of a reinforcement.

13. The pneumatic spring system according to claim 12, wherein the reinforcement consists of a substantially non-expandable material.

14. The pneumatic spring system according to claim 12, wherein an additional support (27) is provided for the diaphragm between the internal cylinder (13) and the external cylinder (16), specifically within the fastening zone of the diaphragm (18), for supporting the latter in the operating condition.

15. The pneumatic spring system according to claim 1, wherein the pressure sensitivity of the connection system (9) is adjusted so that said pneumatic spring system also closes when a minimal excess pressure has remained in the internal chamber (6) of the pneumatic spring, so that the pneumatic spring cover (2) is connected with the pneumatic spring piston (4) even in the presence of incomplete evacuation.

* * * * *